(12) United States Patent
Angelopoulos et al.

(10) Patent No.: US 7,892,596 B2
(45) Date of Patent: Feb. 22, 2011

(54) NANOPARTICLE COATING PROCESS FOR FUEL CELL COMPONENTS

(75) Inventors: Anastasios Angelopoulos, Cincinnati, OH (US); Scott L. Peters, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 675 days.

(21) Appl. No.: 11/608,415

(22) Filed: Dec. 8, 2006

(65) Prior Publication Data

US 2007/0141238 A1    Jun. 21, 2007

Related U.S. Application Data

(60) Provisional application No. 60/751,628, filed on Dec. 19, 2005.

(51) Int. Cl.
*B05C 1/00* (2006.01)

(52) U.S. Cl. .......................... 427/115; 427/58; 427/212; 427/407.1; 427/409; 429/30; 429/38; 429/40; 502/101; 502/185

(58) Field of Classification Search .................. 427/58, 427/115, 212, 407.1, 409, 430.1, 421; 429/30, 429/38, 40; 264/104; 502/101, 185.4
See application file for complete search history.

(56) References Cited

U.S. PATENT DOCUMENTS

| 6,187,467 B1 * | 2/2001 | Zhang et al. .................. 429/42 |
| 6,426,161 B1 * | 7/2002 | Cisar et al. .................... 429/38 |
| 2004/0038808 A1 * | 2/2004 | Hampden-Smith et al. .. 502/180 |

FOREIGN PATENT DOCUMENTS

| CN | 1411618 | 4/2003 |
| CN | 1700494 | 11/2005 |

* cited by examiner

*Primary Examiner*—Nadine G Norton
*Assistant Examiner*—Maki A Angadi
(74) *Attorney, Agent, or Firm*—Reising Ethington P.C.

(57) ABSTRACT

A process including coating a fuel cell component using a coating solution including nanoparticles.

49 Claims, 5 Drawing Sheets

FIG. 9

NANOPARTICLE COATING PROCESS FOR FUEL CELL COMPONENTS

CROSS-REFERENCE TO RELATED APPLICATIONS

This application claims the benefit of U.S. Provisional Application No. 60/751,628, filed Dec. 19, 2005.

TECHNICAL FIELD

The disclosure generally relates to a process of coating fuel cell components.

BACKGROUND

Angelopoulos et al., U.S. Pat. No. 6,025,057 discloses a solution to a problem of making electronic packages, for example printed circuit boards, in which a key requirement for making the same is the achievement of an appropriate Pd/Sn seed layer catalyst loading. Insufficient Pd catalyst will lead to voids in a copper deposited circuit layer creating open circuits. Too much catalyst can cause both adhesive failure and lateral conduction. Adhesive failure results in electroless plating solution leaking beneath the photoresist and deposit copper between circuit elements causing short circuits. The disclosed solution to the problem involves depositing an organic polyelectrolyte onto an organic substrate, such as a circuit board formed from fiberglass and epoxy. A colloidal palladium-tin seed layer is deposited on top of the organic polyelectrolyte. This is followed by depositing a photoimageable polymer on top of the seed layer, and photolithographically patterning the photoimageable polymer to uncover portions of the seed layer. Electroless deposition of copper is used to deposit copper over the uncovered portions of the seed layer. The organic polyelectrolyte is deposited from an aqueous solution at a pH appropriate for the desired seed catalyst coating. A disclosed example of an organic polyelectrolyte is a copolymer of acrylamide and beta-metacryloxy ethyl trimethyl ammonium methylsulfate. The above polyelectrolyte includes hydrolyzed amide groups and is deposited on the organic substrate in an aqueous solution containing sulfuric acid at a pH below 4. In another embodiment the polyelectrolyte is deposited on the organic substrate in an aqueous solution containing sodium hydroxide at a pH above 10. Another polyelectrolyte disclosed is a cationic polyamide-amine. A neutral aqueous solution is deployed with the polyelectrolyte concentration ranging between 0.2 and 1.2 grams per liter. A seed layer of Pd/Sn colloidal suspension is deposited over the polyelectrolyte.

Angelopoulos et al., U.S. Pat. No. 5,997,997 issued Dec. 7, 1999, discloses a solution to a problem associated with fabricating circuitized structures, such as printed circuit boards, wherein conventional electroless plating methods often suffer from excessive seed deposition. The presence of excessive seed on the circuit board leads to leakage shorts, poor adhesion of the photoresist used to circuitize the circuit board on the seed layer due to uneven surfaces. The excess seed layer can also lead to unwanted metal plating in subsequent processing steps. The disclosed solution includes providing a work piece including a substrate coated with a polymeric dielectric layer. The work piece with the polymeric dielectric layer is then baked in the surrounding ambient atmosphere. Thereafter, the work piece is treated with a polymeric surfactant which is capable of hydrogen bonding to weak acid groups on the surface of the polymeric dielectric. A disclosed polymeric surfactant is a cationic polyelectrolyte, having amide groups, such as cationic polyacrylamide or cationic polyamido-amine. The polymeric surfactant has a molecular weight ranging from $10^5$ to $10^7$. A disclosed polyelectrolyte is available under the trade name "Polytech" from Polytech, Inc.

In a field unrelated to printed circuit boards, the fabrication of fuel cell stacks includes the making of bipolar plates with water management features. Capillary driven instability of liquid films in hydrophobic bipolar plate channels can result in liquid holdup and loss of fuel cell performance. Plasma processing to introduce hydrophilic functional groups on the surface of bipolar plates has been shown to eliminate liquid holdup and improve fuel cell performance. However, such plasma processing techniques are very expensive and time consuming. Hence, alternative processing options are needed. One such option is disclosed in assignee's U.S. patent application Ser. No. 11/463,338, filed Aug. 9, 2006, entitled "Fuel Cell Component With Coating Including Nanoparticles." This approach involves spraying a thin coating of hydrophilic nanoparticles onto the bipolar plate surface. However, Applicants have discovered a number of durability concerns may exist with such a process including: (1) the lack of color reflectivity from the coating suggests coverage by the coating is not coherent, (2) that organic acid and surfactant residues remain with the coating, and (3) the strength of the coating is a result of cohesive rather than adhesive interactions (that is, little or no chemical bonding of the coating to the substrate).

SUMMARY OF EXEMPLARY EMBODIMENTS OF THE INVENTION

One embodiment of the invention includes a coating process for fuel cell components including submerging a fuel cell component in a bath including nanoparticles, and a liquid phase including a nanoparticles dispersion agent in at least 30 percent by volume of the liquid phase.

Another embodiment of the invention includes a coating process for fuel cell components including submerging a fuel cell component in a bath including nanoparticles, and a liquid phase including an alcohol in at least 30 percent by volume of the liquid phase.

Another embodiment of the invention includes a coating process for fuel cell components including submerging a fuel cell component in a bath including nanoparticles, and a liquid phase including an alcohol and water, and wherein the alcohol is present in at least 30 percent by volume of the liquid phase, and drying the component, and thereafter repeating the submerging and drying several times.

Other embodiments of the invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Illustrative embodiments of the invention will become more fully understood from the detailed description and the accompanying drawings, wherein.

DETAILED DESCRIPTION OF EXEMPLARY EMBODIMENTS

The following description of the exemplary embodiments are merely illustrative in nature and is in no way intended to limit the invention, its application, or uses.

One embodiment of the invention includes a process including applying an aqueous solution including a polyelectrolyte polymer to a fuel cell component. The polyelectrolyte polymer may include cationic functional groups and/or anionic functional groups. Examples of suitable cationic polyelectrolyte polymers include, but are not limited to, the following: copolymers of acrylamide and quaternary ammonium salts; polyamido-amines; polyallylamine hydrochlorides; epoxy based azo polymers; and acrylic acid based azo polymers. Suitable examples of fuel cell components include, but are not limited to bipolar plates, diffusion media and membrane electrode assemblies. A second coating material may be applied to the polyelectrolyte polymer adhered to the fuel cell component. By way of example, the second coating material may include, but is not be limited to, a hydrophilic or a hydrophobic material. In one embodiment, the second coating material may include nanoparticles. Suitable second coating materials are disclosed in assignee's U.S. patent application Ser. No. 11/463,338, filed Aug. 9, 2006, entitled "Fuel Cell Component With Coating Including Nanoparticles", the disclosure of which is hereby incorporated by reference. In one embodiment of the invention the second coating material includes a hydrophilic material including negatively charged groups which may form strong ionic bonds with a cationic polymer (polyelectrolyte) coated on the fuel cell component.

Figure 1:
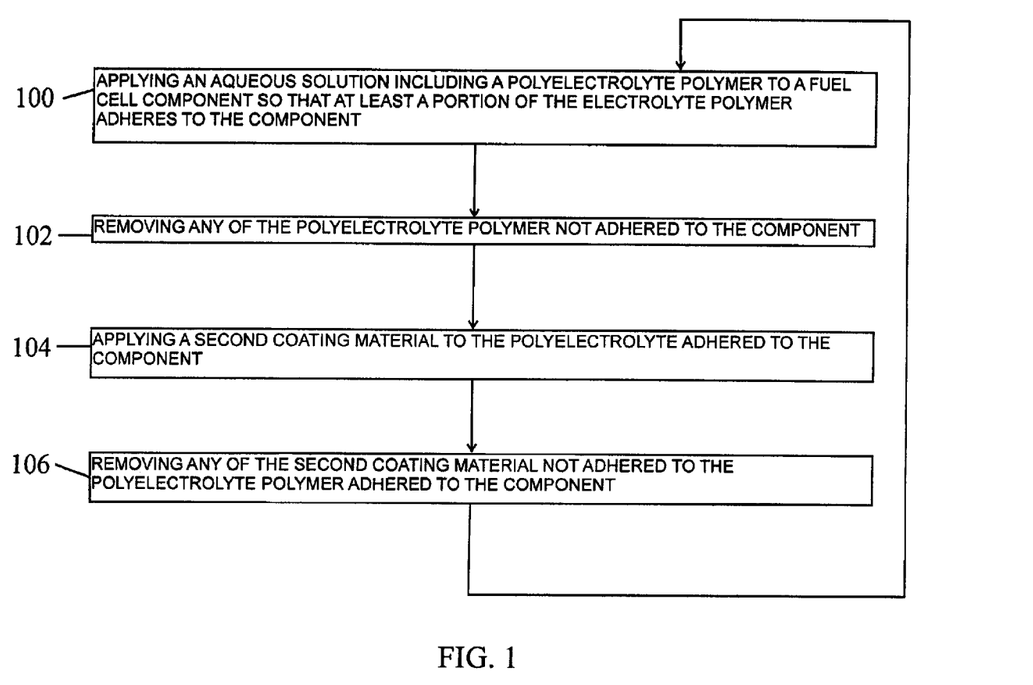
FIG. 1 is a process flowchart illustrating a process according to one embodiment of the invention.

FIG. 1 is a process flow graph illustrating a process according to one embodiment of the invention. In this embodiment, a first step 100 of the process includes applying an aqueous polyelectrolyte polymer solution to a fuel cell component, such as a bipolar plate. A second step 102 of the process includes removing any unadhered polyelectrolyte polymer from the fuel cell component by, for example, rinsing a fuel cell component in deionized water. A third step 104 of the process includes applying a second coating material to the polyelectrolyte polymer adhered to the fuel cell component. The second coating material, may be for example, a material including nanoparticles. Nanoparticles are particles having at least one dimension less than 20 μm.

A fourth step 106 of the process includes removing any of the second coating material not adhered to the polyelectrolyte polymer by, for example, rinsing the fuel cell plate in deionized water. Steps 1 through 4 (100-106) may be repeated several times to build up multiple layers of a polyelectrolyte polymer and a second coating material adhered thereto.

Figure 2:
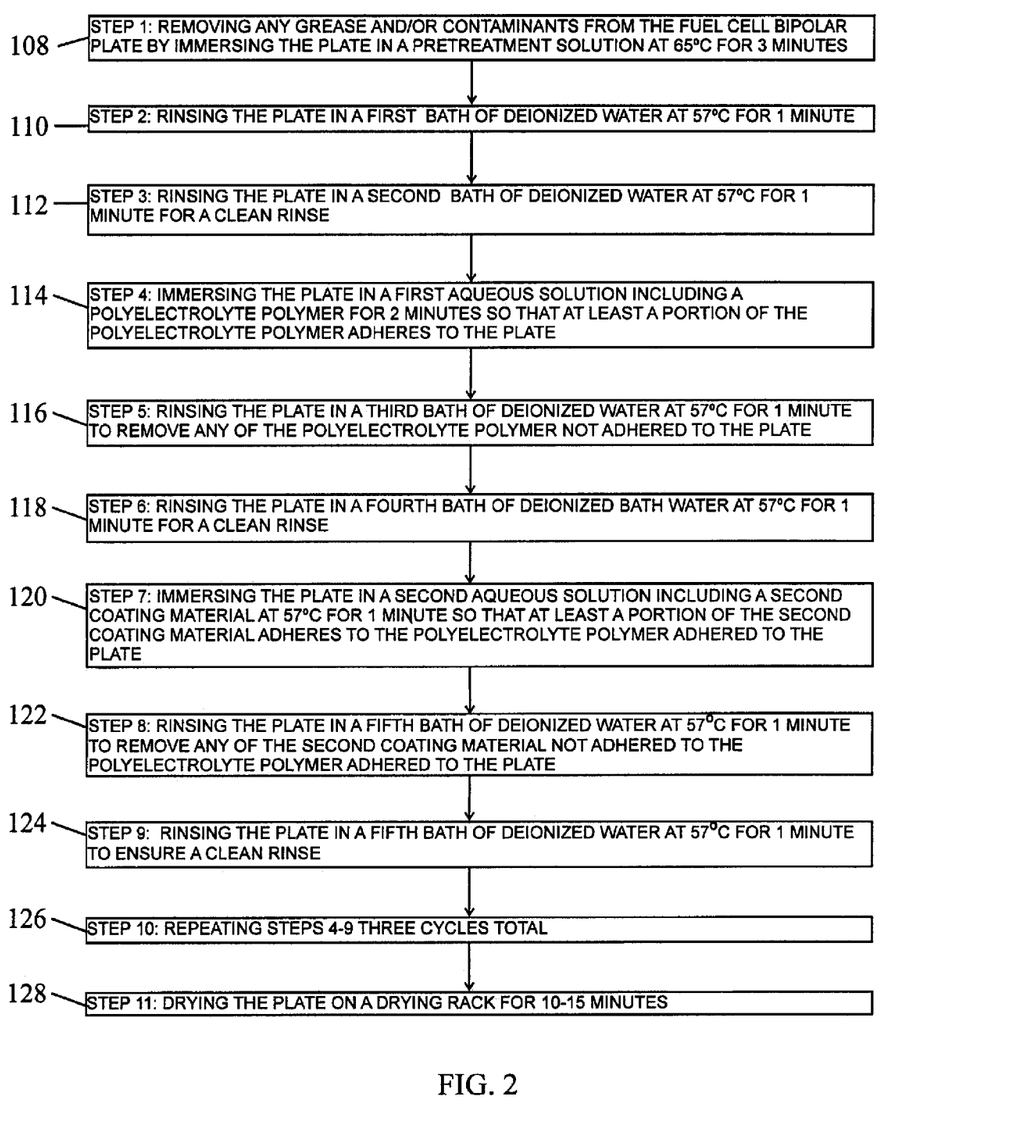
FIG. 2 is a process flowchart illustrating another process according to another embodiment of the invention.

FIG. 2 is a process flow diagram illustrating a process according to another embodiment of the invention. A first step 108 of this process includes removing grease and/or contaminants from a fuel cell bipolar plate by immersing the plate in a pretreatment solution, for example at 65° C. for three minutes. In one embodiment the pretreatment solution includes K2-grade (FDA microelectronics grade) degreaser. A second step 110 of the process includes rinsing the plate in a first bath of deionized water, for example at 57° C. for one minute. A third step 112 of the process includes rinsing the plate in a second bath of deionized water, for example at 57° C. for one minute to perform a clean rinse. A fourth step 114 of the process includes immersing the plate in a first aqueous solution including a first polyelectrolyte polymer, for example for about two minutes. In one embodiment of the invention the first polyelectrolyte polymer is a cationic polyacrylamie, for example Superfloc C-442 or C-446 available from CYTEC. Another example of a cationic polyacrylamide polymer is Polytech 7M available from Polytech, Inc. A fifth step 116 of the process includes rinsing the plate in a third bath of deionized water, for example at 57° C. for one minute, to remove any unadhered first polyelectrolyte polymer. A sixth step 118 of the process includes rinsing the plate in a fourth bath of deionized water, for example at 57° C. for one minute, to perform a clean rinse. A seventh step 120 of the process includes immersing the plate in a second aqueous solution including a second coating material, for example at 57° C. for three minutes. The second coating material may include hydrophilic nanoparticles, such as, X-Tec 4014 or 3408 available from Nano-X. An eighth step 122 of the process includes rinsing the plate in a fifth bath of deionized water, for example at 57° C. for one minute, to remove any unadhered second coating material not adhered to the first polyelectrolyte polymer. A ninth step 124 of the process includes rinsing the plate in a sixth bath of deionized water, for example at 57° C. for one minute, to perform a clean rinse. A tenth step 126 of the process includes repeating steps 4 through 9 (114-124) for three cycles total to build multiple layers of polyelectrolyte polymer and the second coating material thereon. Thereafter, an eleventh step 128 of the process includes drying the plate, for example, by placing the plate on a drying rack for 10-15 minutes.

Examples of suitable second coating materials including nanoparticles are disclosed in assignee's copending U.S. patent Application Ser. No. 60/707,705, examples of such second coating materials are described hereafter. One embodiment of the invention includes a fuel cell component having a substrate, such as, but not limited to, a bipolar plate having a polyelectrolyte polymer thereon and a second coating material including nanoparticles on the polyelectrolyte polymer. The nanoparticles may have a size ranging from about 2 to about 100 nanometers; preferably, about 2 to about 20 nanometers; and most preferably about 2 to about 5 nanometers. The nanoparticles may be include inorganic and/or organic materials. The second coating material may include a compound including hydroxyl, halide, carboxyl, ketonic and/or aldehyde functional groups. The second coating material may make the fuel cell component, such as a bipolar plate, hydrophilic.

One embodiment of the invention includes a fuel cell component having a polyelectrolyte polymer thereon and a permanent hydrophilic coating comprising nanoparticles having hydrophilic side chains on the polyelectrolyte polymer.

One embodiment of the invention, the permanent hydrophilic coating comprising nanoparticles comprising 10 to 90 weight percent inorganic structures, 5 to 70 weigh percent hydrophilic, and 0 to 50 weight percent organic side chains having functional group. In one embodiment of the invention the hydrophilic side chains that are amino, sulfonate, sulfate, sulfite, sulfonamide, sulfoxide, carboxylate, polyol, polyether, phosphate, or phosphonate groups.

In one embodiment of the invention the second coating material may include organic side chains and wherein the functional groups of the organic side chains are epoxy, acryloxy, methacryloxy, glycidyloxy, allyl, vinyl, carboxyl, mercapto, hydroxyl, amide or amino, isocyano, hydroxy, or silanol groups. In one embodiment of the invention the coating has pH ranging from 3 and 10.

Another embodiment of the invention includes depositing a slurry solution on a polyelectrolyte polymer on a fuel cell component. The slurry solution including nanoparticles and a vehicle, and thereafter driving off the vehicle. The vehicle may include water, alcohol, and/or other suitable solvents. In one embodiment the slurry includes 4-5 weight percent nanoparticles and the vehicle present in 95-96 weight percent. In one embodiment the vehicle may be driven off at a temperature ranging from about 80 to about 180° C. The curing period may range from 10 minutes at 80° C. to 10 seconds at 180° C.

Suitable slurry materials are available from Nano-X GmbH under the tradenames HP 3408 and HP 4014. The slurry materials may provide permanent hydrophilic coatings capable of surviving fuel cell operating condition for more than 2500 hours. The permanent coating may be formed on metals, such as aluminum and high-grade stainless steel, polymeric substrates, and electrically conductive composite substrates, such as bipolar plates.

U.S. patent application number 2004/0237833, the disclosure of which is hereby incorporated by reference, describes a number of ways to make a slurry useful in the present invention which are duplicated hereafter.

EXAMPLE 1

221.29 g (1 mol) 3-aminopropyl triethoxy silane are added to 444.57 g sulfosuccinic acid, while stirring, and heated to 120° C. in a silicone bath for 5 hours. After the reaction mixture has cooled, 20 g of the viscous fluid are mixed with 80 g (0.38 mol) tetraethoxy silane, and absorbed in 100 g ethyl alcohol. The solution is then mixed with 13.68 g (0.76 mol) of a 0.1 N HCl solution, and tempered in a water bath overnight, at 40° C. This results in hydrophilic nanoparticles having reactive end groups of approximately 2 nm. The resulting solution is diluted with a mixture of 1/3 water and 2/3 N-methyl pyrrolidone (NMP), to a solid substance content of 5%, and applied to a glass plate by spraying, in a wet film thickness of 10 to 20 µm. Subsequently, the substrate is compacted in a circulating air drying cabinet for 3 hours, at 150° C.

EXAMPLE 2

221.29 g (1 mol) 3-aminopropyl triethoxy silane are added to 444.57 g sulfosuccinic acid, while stirring. Then the solution is heated to 130° C. in a silicone bath. After a reaction time of 1 hour, 332.93 g of an alkaline-stabilized aqueous silica gel solution of the Levasil 300/30% type (pH=10) are added to the reaction solution, while stirring. After a reaction time of 12 hours, the mixture is diluted with water, to a solid substance content of 5%. This results in hydrophilic nanoparticles having reactive end groups of approximately 15 nm. The system is applied to plasma-activated polycarbonate sheets by means of inundation, and subsequently dried in a circulating air drying cabinet for 5 hours, at 130° C.

EXAMPLE 3

123.68 g (0.5 mol) 3-isocyanatopropyl triethoxy silane are added to 600 g (1 mol) polyethylene glycol 600, and heated to 130° C., in a silicone bath, after adding 0.12 g dibutyl tin laurate (0.1 wt.-% with regard to 3-isocyanatopropyl triethoxy silane). 25 g (0.12 mol) tetraethoxy silane and 33.4 g (0.12 mol) 3-glycidyloxy propyl triethoxy silane are added to 50 g of the resulting solution (solution A), while stirring. After adding 15.12 g (0.84 mol) of a 0.1 N HCl solution, the mixture is hydrolyzed and condensed at room temperature for 24 hours. This results in hydrophilic nanoparticles having reactive end groups of approximately 5 nm.

EXAMPLE 4

12.5 g (0.05 mol) 3-methacryloxy propyl trimethyloxy silane, 12.5 g of a 20% aqueous $CeO_2$ solution (from Aldrich), and 50 g ethyl alcohol are added to 50 g of the solution A described in Exemplary Embodiment 3, while stirring, in order to homogenize the mixture, and hydrophilization takes place for 48 h. After adding 0.375 g Ingacure 184 from Ciba Spezialitaten Chemie (3 wt.-% with reference to 3-methacryloxy propyl trimethoxy silane), the mixture is applied to a flamed polycarbonate sheet by means of spraying, in a wet film thickness of at most 30 µm, and first dried thermally in a circulating air drying cabinet at 130° C., for 10 minutes. This is followed by photochemical drying with Hg emitters having a radiation output of 1-2 $J/cm^2$.

The scope of the invention is not limited to the above describe second coating materials and methods of making the same, but includes other second coating materials including nanoparticles formed on the polyelectrolyte polymer on the fuel cell component. The following is a describe of additional embodiments of second coating materials and methods of making the same.

For example, suitable nanoparticles include, but are not limited to, $SiO_2$, other metal oxides, such as $HfO_2$, $ZrO_2$, $Al_2O_3$, $SnO_2$, $Ta_2O_5$, $Nb_2O_5$, $MoO_2$, $IrO_2$, $RuO_2$, metastable oxynitrides, nonstoichiometric metal oxides, oxynitrides, and derivatives thereof including carbon chains or including carbon, and mixtures thereof.

In one embodiment the second coating material is hydrophilic and includes at least one Si—O group, at least one polar group and at least one group including a saturated or unsaturated carbon chain. In one embodiment of the invention the polar group may include a hydroxyl, halide, carboxyl, ketonic or aldehyde functional groups. In one embodiment of the invention the carbon chain may be saturated or unsaturated and may have between 1 to 4 carbon atoms. The second coating material may have addition elements or compounds, including, for example, Au, Ag, Ru, Rh, Pd, Re, Os, Ir, Pt, rare earth metals, alloys thereof, polymeric carbon or graphite to improve conductivity.

In one embodiment of the invention the second coating material includes a Si—O group and an Si—R group wherein R includes a saturated or unsaturated carbon chain, and wherein the molar ratio of Si—R groups to Si—O groups ranges from 1/8 to 1/2, preferably 1/4 to 1/2. In another embodiment of the invention the second coating material further includes hydroxyl groups to improve the hydrophilicity of the coating.

Another embodiment of the invention includes a fuel cell component having a component with a polyelectrolyte polymer thereon and a second coating material on the polyelectrolyte polymer, and wherein the coating is derived from a siloxane. The siloxane may be linear, branched or cyclic. In one embodiment the siloxane has the formula $R_2SiO$ and wherein R is an alkyl group.

In another embodiment of the invention, the second coating material is derived from a material having the formula wherein $R_1$, $R_2$, $R_3$, $R_4$, $R_5$, and $R_6$, each may be H, O, Cl, or a saturated or unsaturated carbon chain having 1 to 4 carbon atoms, and wherein $R_1$, $R_2$, $R_3$, $R_4$, $R_5$, and $R_6$, may be the same or different.

In another embodiment of the invention, the second coating material is derived from a material having the formula:

wherein $R_1$, $R_2$, $R_3$, $R_4$, $R_5$, and $R_6$, each may be H, O, Cl, or a saturated or unsaturated carbon chain having 1 to 4 carbon atoms, and wherein $R_1$, $R_2$, $R_3$, $R_4$, $R_5$, and $R_6$, may be the same or different, and at least one of $R_1$, $R_2$, $R_3$, $R_4$, $R_5$, or $R_6$ is a carbon chain with at least one carbon atom.

Another embodiment of the invention includes a fuel cell component having a polyelectrolyte polymer thereon and a second coating material on the polyelectrolyte polymer, wherein the second coating material includes nanoparticles having a size ranging from 1 to 100 nanometers, preferably 1-50, and most preferably 1-10 nanometers, and wherein the nanoparticles comprises a compound comprising silicon, a saturated or unsaturated carbon chain and a polar group. In one embodiment the coating may have a mean thickness of 80-100 nm.

Figure 3:
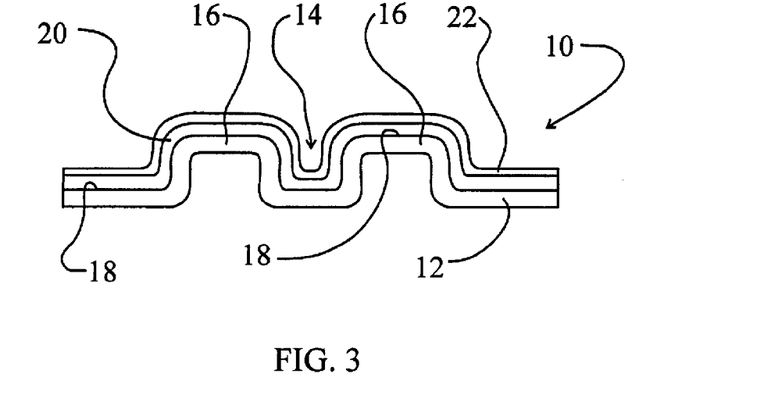
FIG. 3 illustrates a fuel component having a first layer of a polyelectrolyte polymer and a second coating material thereon according to one embodiment of the invention.

As shown in FIG. 3 the fuel cell component 10 may be a bipolar plate which includes a relatively thin substrate 12 that has be stamped to define a gas flow field defined by a plurality of lands 16 and channels 14 (through which the reactant gases flow). The aqueous solution including a polyelectrolyte polymer may be deposited over an upper surface 18 of the substrate 12 so that at least a portion of the polyelectrolyte polymer adheres to the substrate 12 to form a first layer 20. The aqueous solution including a polyelectrolyte polymer may be deposited over the upper surface 18 before or after the substrate 12 has been stamped. Thereafter, an aqueous solution including a second coating material may be applied to the first layer 20 of polyelectrolyte polymer and allowed to dry to form a second coating material 22 on the first layer 20 of polyelectrolyte polymer. The substrate 12 may be a metal such as, but not limited to, stainless steel.

Figure 4:
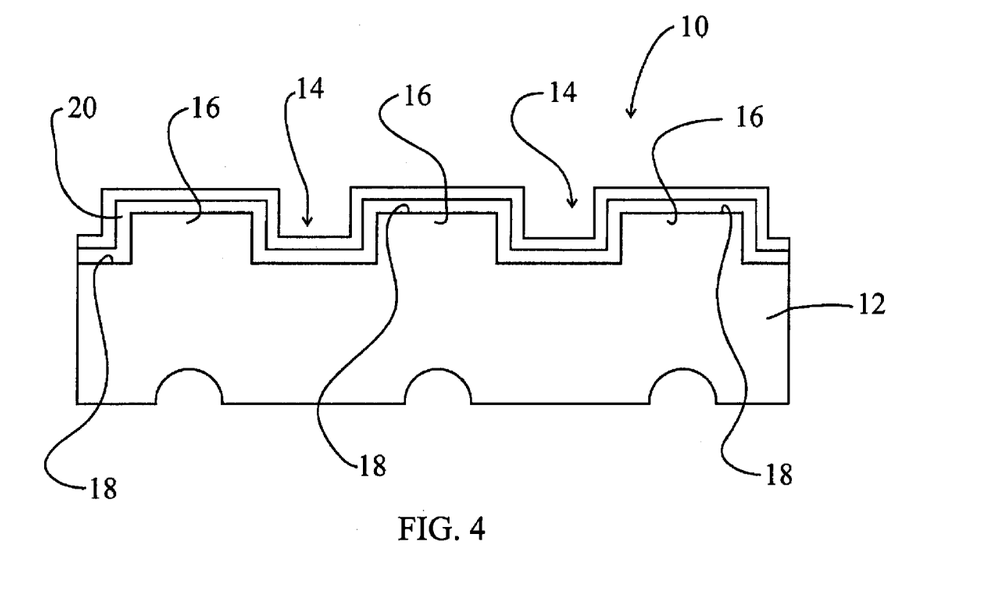
FIG. 4 illustrates a fuel component having a first layer of a polyelectrolyte polymer and a second coating material thereon according to another embodiment of the invention.

Referring now to FIG. 4, another embodiment of the invention include a fuel cell bipolar plate 10 including a substrate 12 that has been machined to define a gas flow field defined by a plurality of lands 16 and channels 14 (through which the reactant gases flow). The aqueous solution including a polyelectrolyte polymer may be deposited over an upper surface 18 of the bipolar plate 10 so that at least a portion of the polyelectrolyte polymer adheres to the substrate 12 to form a first layer 20. Thereafter, an aqueous solution including a second coating material may be applied to the first layer 20 of polyelectrolyte polymer and allowed to dry to form a second coating material 22 on the first layer 20 of polyelectrolyte polymer. The substrate 12 may be a metal such as, but not limited to, stainless steel.

Figure 5:
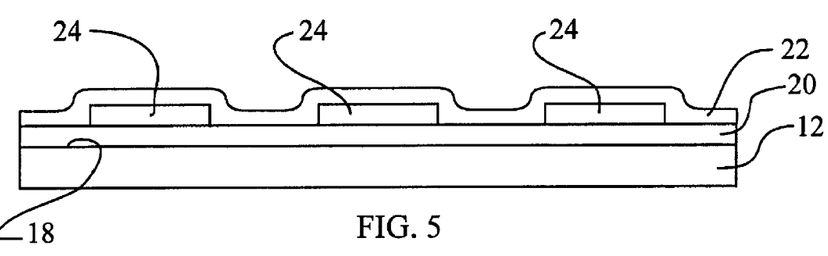
FIG. 5 illustrates a process according to one embodiment of the invention.
Figure 6:
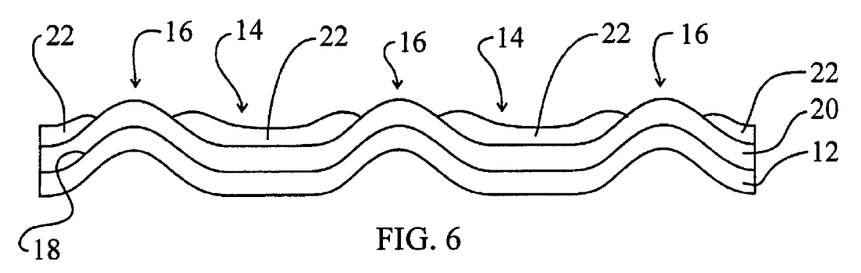
FIG. 6 illustrates a process according to another embodiment of the invention.

Referring now to FIG. 5, in one embodiment the substrate 12 may be coated with a first layer 20 of a polyelectrolyte polymer, and a masking material 24 may be selective deposited over the first layer 20. Thereafter, a second coating material 22 may be deposited over the first layer 20 and the masking material 24. As shown in FIG. 6, the masking material 24 and the second coating material directly over the masking material 24 may be removed to leave selective portion of second coating material 22 on the first layer 20. The substrate 12 may be stamped so that the second coating material is in the channels 14 of a gas flow field. The aqueous solution including the polyelelctrolyte polymer and the aqueous solution including the second coating material may each be applied or deposited on the substrate 12 by dipping, spraying, rolling, brushing or the like.

Figure 7:
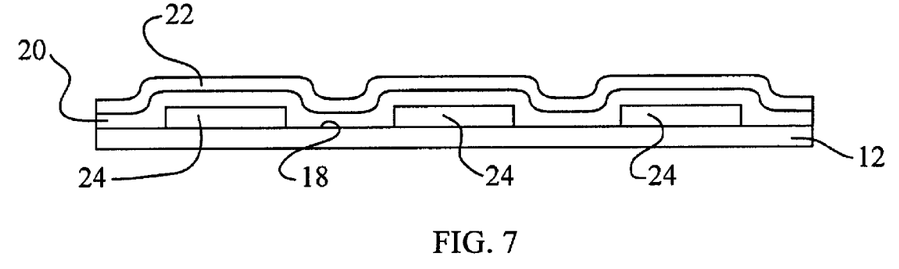
FIG. 7 illustrates a process according to another embodiment of the invention.
Figure 8:
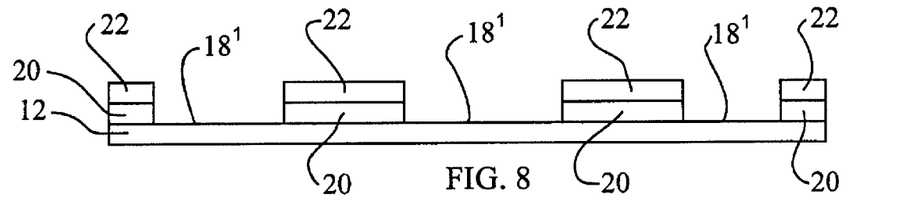
FIG. 8 illustrates a process according to another embodiment of the invention.

Referring now to FIG. 7, in another embodiment, a masking material 24 may be selectively deposited over the upper surface 18 of the substrate 12. A first layer 20 of a polyelectrolyte polymer may be formed over the masking material 24 and the exposed portions 18 of the upper surface of the substrate 12. Then a second coating material 22 may be formed over the first layer 20. Thereafter, the masking material 24 and the portion of the first layer 20 and second coating material 22 directly over the masking material 24 may be removed as shown in FIG. 8. Similar masking techniques may be used for machined substrates.

In another embodiment of the invention a coating process that may or may not utilize the above describe coating process using an aqueous solution including a polyelectrolyte. In this embodiment of the invention, fuel component is submerged in a bath including the above describe nanoparticles and a liquid phase including a nanoparticle dispersion agent in an amount of at least 30 volume percent of the liquid phase. The liquid phase may include 30-100 volume percent of a nanoparticle dispersion agent, or any volume percent there between. The liquid phase my also include water in an amount of 0.1 to 70 volume percent of liquid phase, or any volume percent there between. Suitable nanoparticle dispersion agents include, but are not limited to, alcohols, including at least one of methanol, ethanol or propanol. Any organic solvent that forms a solution with water and provides dispersion properties is considered a suitable dispersion agent. When X-Tec 3408 or 4014 are used, the nanoparticles constitute 4-5 weight percent of the X-Tec material. In one embodiment of the invention, the nanoparticles may be present in an amount of 0.2 to 5 weight percent of the bath solution.

After the fuel cell component has been submerged in the above described bath and removed there from, the fuel cell component optionally may be rinsed in water (such as DI water) to remove any coating not adhered to the fuel cell component and there after dried by exposing the fuel cell component to at least one of ambient air, convection oven, infrared or microwave energy. The submerging, rinsing and drying produce a coating of nanoparticles at least 25 nm thick. In one embodiment of the invention, the submerging, rinsing and drying produces a nanoparticles coating on the fuel cell component have 0.4 atomic weight percent silicon in the coating.

Thereafter, the submerging, rinsing and drying may be repeated several times to build multiple layers of nanoparticle coating on the fuel cell component. For example, the submerging, rinsing and drying may be conducted at least on the same fuel cell component to produce a nanoparticle coating that is at least 100 nm thick. In one embodiment of the invention, the submerging, rinsing and drying are repeated to produce a nanoparticles coating on the fuel cell component have 1.5 atomic weight percent silicon in the coating. Suitable materials for the nanoparticles are described above, particularly X-Tec 3408 and/or 4014 available from Nano-X, or silica nano-powders available from Sigma-Aldrich. One embodiment of the invention includes at least 1 part X-Tec 3408 or 4014 to 19 parts solvent by volume, wherein the solvent is at least 30 percent alcohol (in water) by volume.

Figure 9:
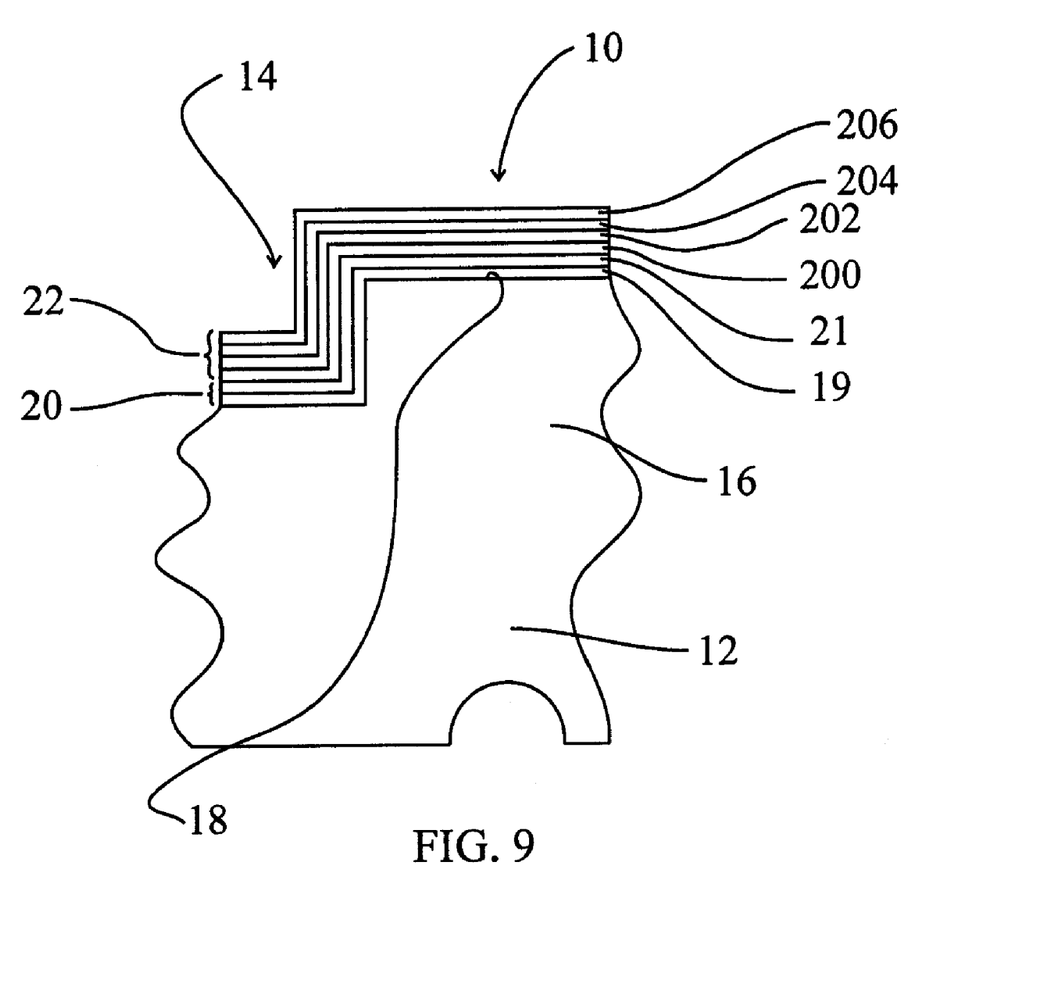
FIG. 9 illustrates a product according to one embodiment of the invention.

Referring now to FIG. 9, one embodiment of the invention includes a fuel cell component 10, such as a bipolar plate, including a substrate 12 have a gas flow field defined by a plurality of lands 16 and channels 14. A first layer 20 of polyelectrolyte polymer is over an upper surface 18 of the substrate. The first layer 20 includes multiple layers 19, 21, each including a polyelectrolyte polymer formed according to the above described aqueous coating process. A second layer 22 of nanoparticles is provided over the first layer 20 of the polyelectrolyte polymer. The second layer 22 of nanoparticles may be formed of multiple layers 200, 202, 204, 206, each including nanoparticles, formed by the above described dipping process for depositing successive layers of nanoparticles. Layers 200, 202, 204, 206, in one embodiment of the invention, together are at least 100 nm thick and together have at least 1.5 atomic weight percent silicon.

The description of the invention is merely exemplary in nature and, thus, variations thereof are intended to be within the scope of the invention. Such variations are not to be regarded as a departure from the spirit and scope of the invention.

What is claimed is:

1. A process comprising:
  applying an aqueous solution comprising a polyelectrolyte polymer to the fuel cell component so that at least a portion of the polyelectrolyte polymer adheres to at least a portion of the component the polyelectrolyte polymer comprising first functional groups;
  submerging a fuel cell component in a bath comprising nanoparticles comprising second functional groups and a liquid phase comprising a nanoparticle dispersion agent;
  removing the fuel cell component from the bath so that a coating of nanoparticles adheres to the polyelectrolyte polymer adhered to the fuel cell component and wherein the first functional group and second functional group form an ionic bond;
  rinsing the fuel cell component to remove any nanoparticles not sufficiently adhered to the fuel cell component prior to drying the coating; and
  drying the coating.

2. A process as set forth in claim 1 wherein the dispersion agent comprises an alcohol.

3. A process as set forth in claim 2 wherein the alcohol is present in at least 30 percent by volume of the liquid phase.

4. A process as set forth in claim 3 wherein the liquid phase further comprises water in an amount of 0.1-70 volume percent of the liquid phase.

5. A process as set forth in claim 2 wherein the alcohol comprises at least one of methanol, ethanol or propanol.

6. A process as set forth in claim 1 wherein the nanoparticle dispersion agent comprises an organic solvent capable of making a solution with water.

7. A process as set forth in claim 6 wherein the liquid phase further comprises water.

8. A process as set forth in claim 1 repeating the applying submerging, removing, rinsing and drying to process at least two layers of nanoparticles on the fuel cell component.

9. A process as set forth in claim 1 wherein the fuel cell component comprises a bipolar plate.

10. A process as set forth in claim 1 wherein the polyelectrolyte polymer includes positive cationic functional groups.

11. A process as set forth in claim 1 wherein the polyelectrolyte polymer includes anionic functional groups.

12. A process as set forth in claim 1 further comprising applying a second coating material to the polyelectrolyte polymer adhered to the component.

13. A process as set forth in claim 10 further comprising applying a second coating material including negative functional groups to the polyelectrolyte polymer adhered to the component and so that the negative functional groups and the positive functional groups form an ionic bond.

14. A process as set forth in claim 1 wherein the nanoparticles include negative functional groups.

15. A process as set forth in claim 1 wherein the nanoparticles comprising siloxane.

16. A process as set forth in claim 1 wherein the nanoparticles comprise silicon dioxide.

17. A process as set forth in claim 1 wherein the nanoparticles are present in an amount of 0.2 to 5 weight percent of the bath.

18. A process comprising:
  (a) applying an aqueous polyelectrolyte polymer solution to a fuel cell component so that at least a portion of the polyelectrolyte polymer adheres to at least a portion of the component;
  (b) removing any polyelectrolyte polymer not adhered to the fuel cell component;
  (c) adhering a second coating material to the polyelectrolyte polymer adhered to the component;
  (d) removing any of the second coating material not adhered to the polyelectrolyte polymer adhered to the component;
  (e) submerging the fuel cell component in a bath comprising nanoparticles and a liquid phase comprising a dispersion agent;
  (f) removing the fuel cell component from the bath so that a coating of nanoparticles adheres to the fuel cell component and;
  (g) rinsing the fuel cell component to remove any nanoparticles not sufficiently adhered to the fuel cell component.

19. A process as set forth in claim 18 further comprising repeating (a-d) several times.

20. A process as set forth in claim 18 further comprising repeating (f-g) several times.

21. A process as set forth in claim 18 wherein the nanoparticles are present in an amount of 0.2 to 5 weight percent of the bath.

22. A process comprising:
  (a) removing grease and contaminants from a fuel cell bipolar plate by immersing the plate in a pretreatment solution;
  (b) rinsing the plate in a first bath of deionized water;
  (c) rinsing the plate in a second bath of deionized water;
  (d) immersing the plate in a first aqueous solution of a first polyelectrolyte polymer;
  (e) rinsing the plate in a third bath of deionized water to remove any of the first polyelectrolyte polymer not adhered to the plate;
  (f) rinsing the plate in a fourth bath of deionized water;

(g) immersing the plate in a second dispersion comprising a second coating material, wherein the second dispersion includes nanoparticles and an alcohol;
(h) rinsing the plate in a fourth bath of deionized water to remove any of the second coating material not adhered to the first polyelectrolyte polymer adhered to the plate;
(i) rinsing the plate in a fifth bath of deionized water;
(j) repeating (d-I) for at least three cycles;
(k) drying the plate.

23. A process as set forth in claim 22 wherein the first polyelectrolyte polymer adhered to the plate includes cationic functional groups.

24. A process as set forth in claim 23 wherein the nanoparticles having anionic functional groups.

25. A process as set forth in claim 22 wherein the first polyelectrolyte polymer comprises at least one of: a copolymer of acrylamide and quaternary ammonium salts; a polyamido-amine; a polyallylamine hydrochloride; an epoxy based azo polymer; or an acrylic acid based azo polymer.

26. A process as set forth in claim 22 wherein the nanoparticles are present in an amount of 0.2 to 5 weight percent of the dispersion.

27. A process comprising:
applying an aqueous solution comprising a polyelectrolyte polymer to a fuel cell component so that at least a portion of the polyelectrolyte polymer adheres to at least a portion of the component the polyelectrolyte polymer comprising a first ionic functional group;
removing any unadhered polyelectrolyte polymer from the fuel cell component; and
applying a second coating material to the polyelectrolyte polymer adhered to the fuel cell component, the second coating material comprising nanoparticles and a dispersion agent where the nanoparticles comprises a second ionic functional group having a charge opposite the first group so that the nanoparticles adhere to the polyelectrolyte polymer adhered to the fuel cell component.

28. A process as set forth in claim 27 wherein the fuel cell component comprises a bipolar plate.

29. A process as set forth in claim 27 wherein the polyelectrolyte polymer includes cationic functional groups.

30. A process as set forth in claim 27 wherein the polyelectrolyte polymer includes anionic functional groups.

31. A process as set forth in claim 27 wherein the nanoparticles having a size ranging from about 2 to about 100 nanometers.

32. A process as set forth in claim 27 wherein the nanoparticles comprise inorganic or organic materials.

33. A process as set forth in claim 27 wherein the nanoparticles comprising hydrophilic side chains.

34. A process as set forth in claim 27 wherein the nanoparticles comprise 10 to 90 weight percent inorganic structures, 5 to 70 weigh percent hydrophilic, and 0 to 50weight percent organic side chains having a functional group.

35. A process as set forth in claim 27 wherein the nanoparticles comprise at least one of an amino, sulfonate, sulfate, sulfite, sulfonamide, sulfoxide, carboxylate, polyol, polyether, phosphate, or phosphonate group.

36. A process as set forth in claim 27 wherein the nanoparticles comprise organic side chains having functional groups and wherein the functional groups of the organic side chains are epoxy, acryloxy, methacryloxy, glycidyloxy, allyl, vinyl, carboxyl, mercapto, hydroxyl, amide or amino, isocyano, hydroxy, or silanol groups.

37. A process as set forth in claim 27 wherein the fuel cell component comprise a substrate comprising at least one of a metal, polymeric material or electrically conductive composite material.

38. A process as set forth in claim 27 wherein the nanoparticles comprise at least one of $SiO_2$, $HfO_2$, $ZrO_2$, $Al_2O_3$, $SnO_2$, $Ta_2O_5$, $Nb_2O_5$, $MoO_2$, $IrO_2$, $RuO_2$, metastable oxynitrides, nonstoichiometric metal oxides, oxynitrides, or derivatives thereof including carbon chains or including carbon, or mixtures thereof.

39. A process as set forth in claim 27 wherein the nanoparticles comprise at least one Si—O group, at least one polar group and at least one group including a saturated or unsaturated carbon chain.

40. A process as set forth in claim 27 wherein the nanoparticles comprise a polar group comprising at least one of a hydroxyl, halide, carboxyl, ketonic or aldehyde functional groups.

41. A process as set forth in claim 27 wherein the second coating material further comprises Au, Ag, Ru, Rh, Pd, Re, Os, Ir, Pt, rare earth metals, alloys thereof, polymeric carbon or graphite.

42. A process as set forth in claim 27 wherein each of the nanoparticles comprises a Si—O group and a Si—R group wherein R includes a saturated or unsaturated carbon chain, and wherein the molar ratio of Si—R groups to Si—O groups ranges from 1/8 to 1/2.

43. A process as set forth in claim 27 wherein the second coating material comprises a material derived from a siloxane.

44. A process as set forth in claim 27 wherein the nanoparticles are derived from a material having the formula:

wherein $R_1$, $R_2$, $R_3$, $R_4$, $R_5$, and $R_6$, each may be H, O, Cl, or a saturated or unsaturated carbon chain having 1 to 4 carbon atoms, and wherein $R_1$, $R_2$, $R_3$, $R_4$, $R_5$, and $R_6$, may be the same or different, and at least one of $R_1$, $R_2$, $R_3$, $R_4$, $R_5$, or $R_6$ is a carbon chain with at least one carbon atom.

45. A process as set forth in claim 27 wherein the applying a second coating comprises submerging the fuel cell component in a bath comprising the nanoparticles and a dispersion agent.

46. A process as set forth in claim 45 further comprising removing the fuel cell component from the bath and drying the second coating.

47. A process as set forth in claim 46 further comprising repeating the submerging, removing the fuel cell component from the bath and the drying to produce multiple layers of nanoparticles on the fuel cell component, and wherein the multiple layers together are at least 100 nm thick.

48. A process as set forth in claim 46 wherein the nanoparticles comprise silicon, and further comprising repeating the submerging, removing the fuel cell component from the bath and the drying to produce multiple layers of nanoparticles on the fuel cell component, and wherein the multiple layers together have at least 1.5 atomic weight percent silicon.

49. A process as set forth in claim 45 wherein the nanoparticles are present in an amount of 0.2 to 5 weight percent of the bath.

* * * * *